L. R. SHELL.
MEASURING PUMP.

No. 185,583. Patented Dec. 19, 1876.

WITNESSES:
W. W. Hollingsworth
Solon C. Kemon

INVENTOR:
Leonidas R. Shell
BY
Kenyon & Co.
ATTORNEYS.

THE GRAPHIC CO. N.Y.

UNITED STATES PATENT OFFICE.

LEONIDAS R. SHELL, OF RICHMOND, VIRGINIA, ASSIGNOR OF ONE-HALF OF HIS RIGHT TO RICHARD B. CHAFFIN, OF SAME PLACE.

IMPROVEMENT IN MEASURING-PUMPS.

Specification forming part of Letters Patent No. 185,583, dated December 19, 1876; application filed October 2, 1876.

*To all whom it may concern:*

Be it known that I, LEONIDAS R. SHELL, of Richmond, in the county of Henrico and State of Virginia, have invented a new and Improved Oil-Can; and I do hereby declare that the following is a full, clear, and exact description of the same, reference being had to the accompanying drawing, forming part of this specification, in which—

Figure 1:
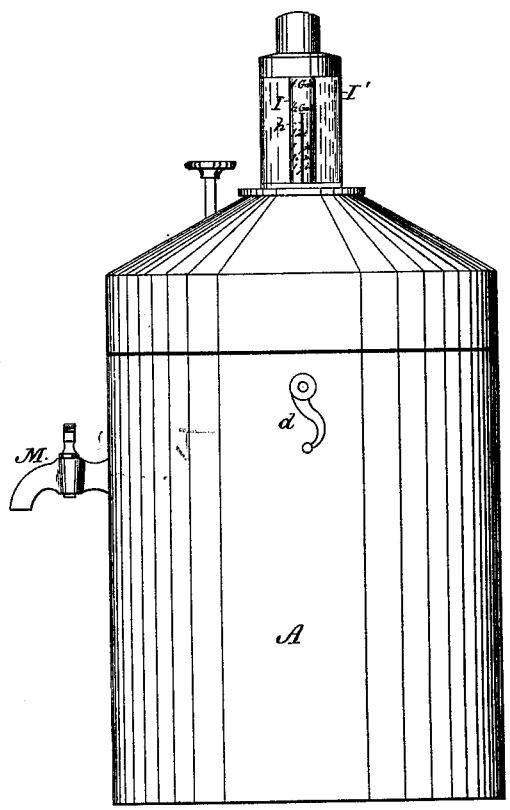
Figure 2:
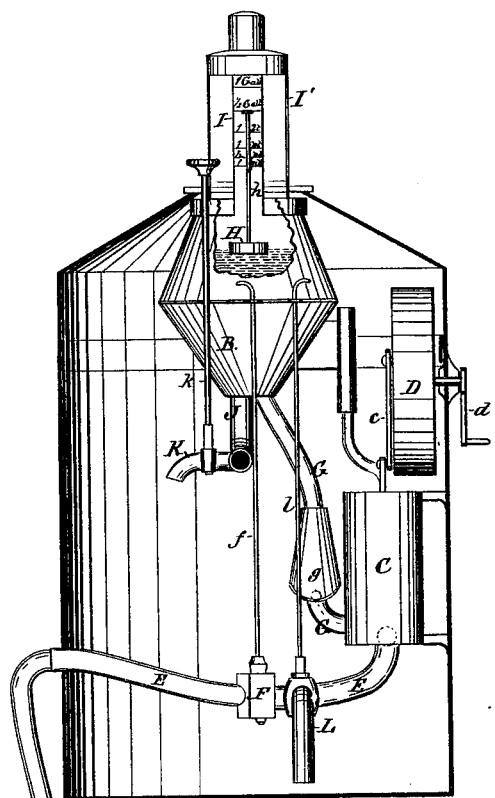

Figure 1 represents a side elevation of the invention, and Fig. 2 a vertical section of the same.

The invention relates to an oil-can having attached within it a force-pump and measure, so constructed and arranged that the oil may be pumped from the barrel or cask either into the can itself or into the contained measure, the latter being provided with a gage, which at all times shows how much oil it contains.

When it is desired to fill the can, the oil may, by this arrangement, be made to pass first into the measure gallon by gallon, thus readily showing how much is transferred from the barrel to the can, and when selling the oil by retail any definite quantity may be drawn immediately from the can by means of the contained pump measure and gage.

In the accompanying drawing, A represents an oil-can, containing the measure B and force-pump C, the piston of the latter being operated by the pitman $c$, the upper end of which pivots eccentrically on the wheel D, which has its bearing in the side of the can, and is turned by the crank-handle $d$.

The oil is drawn into the pump through the pipe E, running from its bottom through the side of the can, and shown in Fig. 2 connected by rubber tubing with a barrel of oil. Said tube may be closed, when necessary, by means of the cock F, the handle $f$ of which extends up to the top of the can, so as to be easily accessible. G is the tube which connects the pump C and measure B, and through which the oil is forced when the piston descends, the pump being furnished below with a spherical metallic valve to prevent its return into the tube E. The tube G has a similar valve in its enlarged part $g$, which prevents the oil returning from the measure. H is a float, having the small standard $h$, provided with a marker on its end rising from its center. When there is a certain quantity of oil in the measure, the marker on the end of said standard points to the same quantity on the glass gage I, attached to the top of the measure, and surrounding the float and standard. Said gage has, for the sake of protection, the glass cover I'. J is a tube, running from the bottom of the measure B, and ending in the cock M outside of the can, and provided with a second cock, K, within the can.

When it is desired to pump oil into the measure, the cocks K and M are closed, the former by means of its handle $k$, which, for convenience, passes out of the can through an opening in the cover. Upon opening then the cock K, the measured oil flows out into the can. Said cock may be left open, and the oil allowed to pass to it from the tube G. In that case the oil will not be measured.

When the can is full, and it is desired to draw off any definite quantity, the cock F of the tube E is closed, and the cock L opened by means of its handle $l$. The pump then is in communication with the interior of the can, and the required amount, as shown by the gage I, is pumped into the measure. Thus, by closing the cock K and opening M, the measured oil will flow out into the receptacle.

Having thus described my invention, what I claim as new is—

1. In an oil-can, the combination, with the can-body A and pump C, of the tube E, cocks F and L, tube G, measure B, and gage I, substantially as shown and described, for the purpose specified.

2. In an oil-can, the combination, with the can-body A, pump C, and measure B, of the gage I, pipe J, cocks K and M, and handle $k$, substantially as shown and described, for the purpose specified.

3. In an oil-can, the combination, with the can-body A, pump C, and measure B, of the float H, standard $h$, and glass scale I, substantially as shown and described, for the purpose specified.

LEONIDAS R. SHELL.

Witnesses:
JOHN BOWERS,
JNO. I. STEVENSON.